United States Patent [19]

Vaniglia

[11] Patent Number: 4,877,193
[45] Date of Patent: Oct. 31, 1989

[54] REDIRECT ROLLER APPARATUS FOR FIBER PLACEMENT MACHINE

[75] Inventor: Milo M. Vaniglia, Southgate, Ky.

[73] Assignee: Cincinnati Milacron Inc., Cincinnati, Ohio

[21] Appl. No.: 236,417

[22] Filed: Aug. 25, 1988

[51] Int. Cl.$^4$ .................. B21F 17/00; B32B 31/00
[52] U.S. Cl. ......................... 242/7.21; 156/574; 156/361
[58] Field of Search .............. 242/7.21; 156/361, 523, 156/522, 525, 574, 575

[56] References Cited

U.S. PATENT DOCUMENTS

| | | | |
|---|---|---|---|
| 1,189,611 | 7/1916 | Morse | 242/76 |
| 4,420,121 | 12/1983 | Shawcross | 242/76 |
| 4,601,775 | 7/1986 | Grone | 156/523 |
| 4,696,707 | 9/1987 | Lewis | 156/64 |
| 4,699,683 | 10/1987 | McCowin | 156/353 |
| 4,750,965 | 6/1988 | Pippel | 156/361 |

OTHER PUBLICATIONS

"Milacron Today", vol. 4, No. 6, published Jun. 16, 1989, by Cincinnati Milacron Inc., front page article entitled: Fiber Placement: Automating Complex Composite Parts Processing.

Fiber Placement Process Study by Don O. Evans, Milo M. Vaniglia and Paul C. Hopkins, published in SAMPE 34th Symposium Book of Proceeding, May 8-11, 1989.

Primary Examiner—Joseph J. Hail, III
Assistant Examiner—Katherine Matecki
Attorney, Agent, or Firm—Thomas M. Farrell

[57] ABSTRACT

An improved fiber guidance system for a fiber placement machine where a fiber placement head is moved by a manipulator wrist with respect to a relatively stationary creel assembly, and a plurality of fiber redirect rollers are used, each having a caster-like mounting base, one roller assembly being mounted to the machine member with the creel assembly, and one member being mounted to the fiber placement head, so that a band of fibers is trained around the first and second redirect rollers under tension and the redirect rollers will swivel about their bases in accordance with spatial orientations of the placement head and in accordance with tension of fiber band, thereby maintaining approximately equal tension at the outer fibers at each side of the fiber band.

1 Claim, 5 Drawing Sheets

REDIRECT ROLLER APPARATUS FOR FIBER PLACEMENT MACHINE

BACKGROUND OF THE INVENTION

The invention relates to fiber placement machines which may employ multiple strands or tows of fiber which are pulled from a creel assembly and placed on a surface or workpiece. Such machines may include filament winders, which utilize plural filaments when winding rotary shapes.

Fiber placement machines may also be employed to place tows of fiber on flat, curved, or compound contours. Prior art assemblies include filament winding machines which deploy plural relatively parallel filaments on a rotary member, where the filaments pass through a payout eye which may be rotated about an axis parallel to the longitudinal path travelled by the filaments to keep the filaments spaced for a variety of winding angles as the paid-out filaments traverse the rotary axis of the member to be wound.

Applicant's assembly is directed to a machine which utilizes a creel assembly for supplying filamentous composite material to a laydown surface, where the machine system includes at least a multi-axis manipulator wrist which may orient the laydown tip of the assembly through a wide variety of spatial orientations with respect to the supply creel assembly.

It is an object of the invention to provide spacing for the fiber tows, preferably with virtually no drag, and regardless of head orientation.

SUMMARY OF THE INVENTION

The invention is shown embodied in a fiber placement machine having a band of fibers oriented with its length relatively running along a path with respect to a relatively stationary machine member and wherein the band is ultimately paid-out to a fiber application surface, and where the invention is an improved fiber guidance system comprising a fiber supply creel of plural spools of fiber mounted to the relatively stationary machine member;

a manipulator wrist affixed to the machine member;

a fiber placement head carried by the manipulator wrist, and having a fiber payout zone, the head capable through manipulation of variety of spatial orientations, i.e., least two-dimension spatial orientations with respect to the stationary machine member;

a plurality of fiber redirect rollers each having roller elements rotatable about a first rotary axis with respect to a roller base, wherein said roller base includes a bearing member for providing rotary swivel movement of the base about an axis transverse to the roller axis, and wherein at least one direct roller is affixed to the relatively stationary machine member and at least a second redirect roller is affixed to the fiber placement head, and wherein a band of fibers is trained around said first and second redirect rollers under tension, and said redirect rollers will swivel about their bases in accordance with spatial orientation of the placement head and in accordance with tension of the fiber band, thereby maintaining approximately equal tension at the outer fibers at each side of the fiber band.

DESCRIPTION OF THE PREFERRED EMBODIMENT

Figure 1:
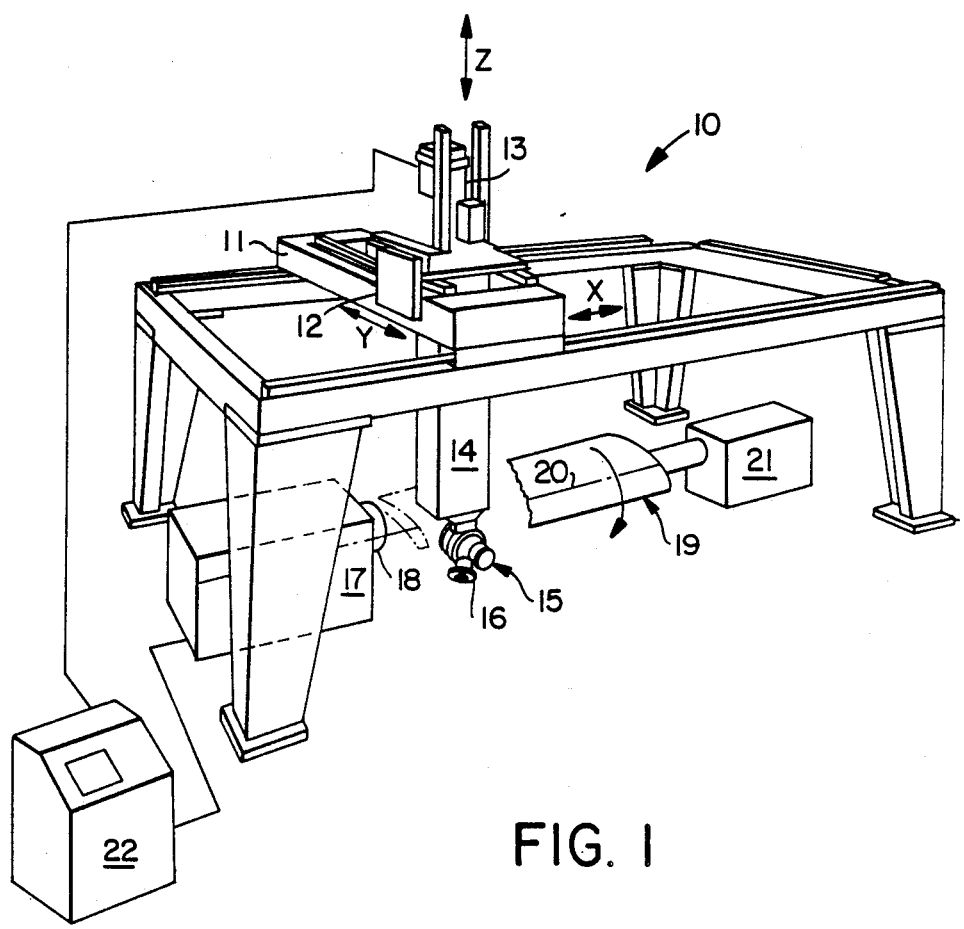
FIG. 1 is a perspective view of a fiber placement machine.

FIG. 1 shows a gantry machine or robot 10 having an elevated way system suitable for carrying a carriage 11 and cross-slide 12 in X and Y directions, in a plane parallel to the floor. The cross-slide 12 supports a saddle 13 for vertical movement, and the saddle 13 has a forearm 14 which contains a drive mechanism (not shown) for actuating a wrist 15 supported at the end of the forearm 14. The forearm 14 and wrist 15 are manufactured substantially as the serial roll wrist depicted in the U.S. Pat. No. 4,068,536, assigned to Cincinnati Milacron Inc., the assignee of the present invention. The gantry robot 10 depicted in FIG. 1 is commercially available from Cincinnati Milacron Inc., under the Model No. T3-886 gantry series industrial robot, and other similar mechanisms will suffice. As described in the aforementioned U.S. patent, the wrist 15 has the capability of moving a tooling plate 16 in three degrees of rotary motion, and a desired tool assembly, or end effector (not shown), is affixed to the tooling plate 16. It will be appreciated that other wrists, for example, the roll-bend-roll variety of manipulators, may be employed.

A variety of work may be positioned on the floor within the range of the tooling plate 16. The work may be flat or curved; rotating or stationary.

A servo-controlled mandrel unit 17 is shown, having a rotary spindle 18 for positioning an exemplary workpiece, such as an air foil form 19. The mandrel unit 17 is, in effect, a headstock capable of supporting, driving, and positioning work about a reference axis 20, here shown horizontally.

Here it should be noted that a variety of mandrel units and auxiliary footstocks may be suitable for positioning work.

A computer numerical control (CNC) 22 is employed to control the multi-degree-of-freedom spatial positioning of the tooling plate 16 and selected end effector. The CNC 22 also controls the work position about the reference axis 20. One such control is commercially available under the trademark ACRAMATIC—Model 965-C CNC, from Cincinnati Milacron Inc.

Figure 2:
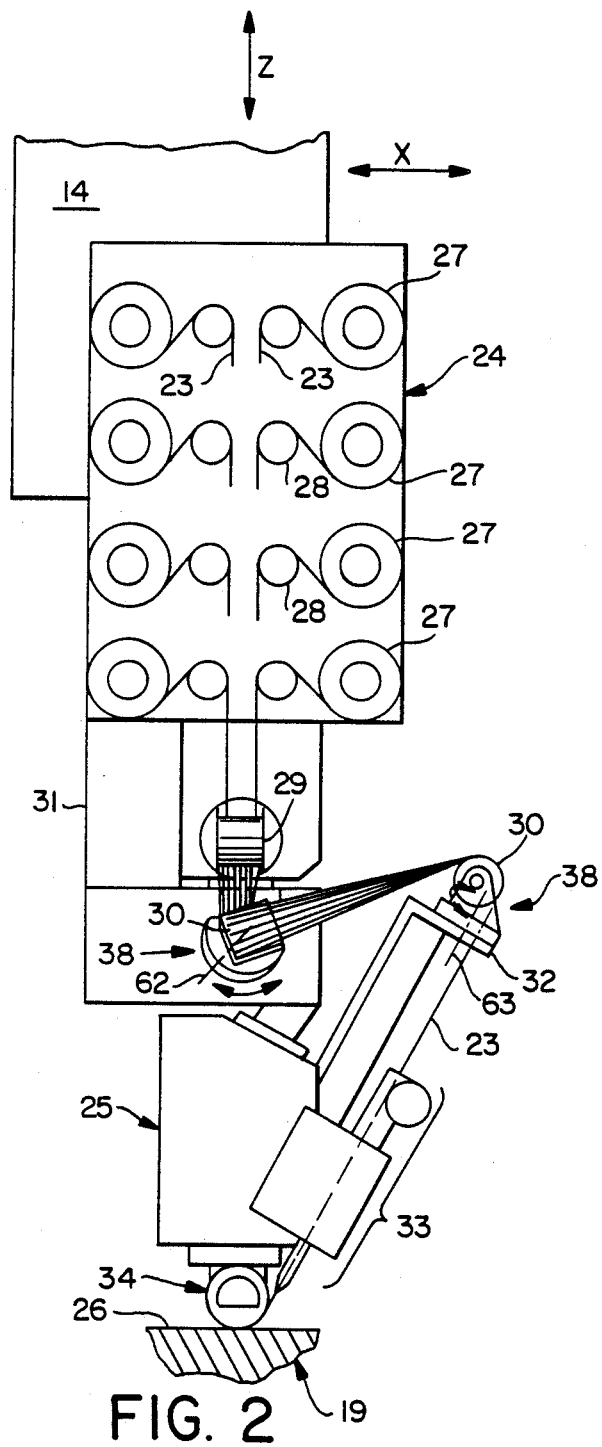
FIG. 2 is an elevational view showing the vertical forearm of the fiber placement machine of FIG. 1 supporting a fiber placement head.

With reference to FIGS. 1 and 2, the machine 10 is arranged to place long and short lengths of fiber tows 23 on the air foil form 19, for example, in an operation similar to filament winding, but where the tows may extend along concave, or undercut, surfaces.

FIG. 2 schematically depicts the vertical forearm 14 of FIG. 1 with a creel assembly 24 mounted thereto. A fiber placement head 25 is affixed to the wrist tooling plate 16 and is wieldable to approach the workpiece surface 26, it being appreciated by those skilled in the art that the surface may be curved as well as flat, and the surface 26 may move with respect to the fiber placement head 25 and vice-versa. The creel assembly 24 and fiber placement head 25 are thus movable on a common forearm 14 and the wrist 15 provides relative movement between the placement head 25 and the creel assembly 24. The creel assembly 24 is depicted schematically as having eight spools 27 of fiber tows 23, each tow 23 pulled from a spool 27 and trained over a respective tension-maintaining roller 28, in a manner known in the tensioner art, which, basically comprises the use of radially-movable dancer rolls. The eight tows 23 depicted are guided around a grooved roller 29 affixed to the forearm 14, and are then trained around a pair of redirect rollers 30 carried on a creel bracket 31 and an outboard support bracket 32 of the placement head 25. The creel bracket 31 constitutes a relatively-stationary machine member, or base, for referencing movement of the relatively-movable placement head 25 and bracket 32 which are moved by the manipulator wrist 15. The redirect rollers 30 are mounted in bearings so that they may swivel and thus be automatically oriented in accordance with tension of the fiber tows 23. The tows 23 are brought through a clamp, cut and restart unit ("CCR" unit) 33 and are finally brought around a presser member assembly 34 where they are impressed on the work surface 26.

The details of the CCR unit 33 and presser member assembly 34 do not form part of the present invention.

Figure 3:
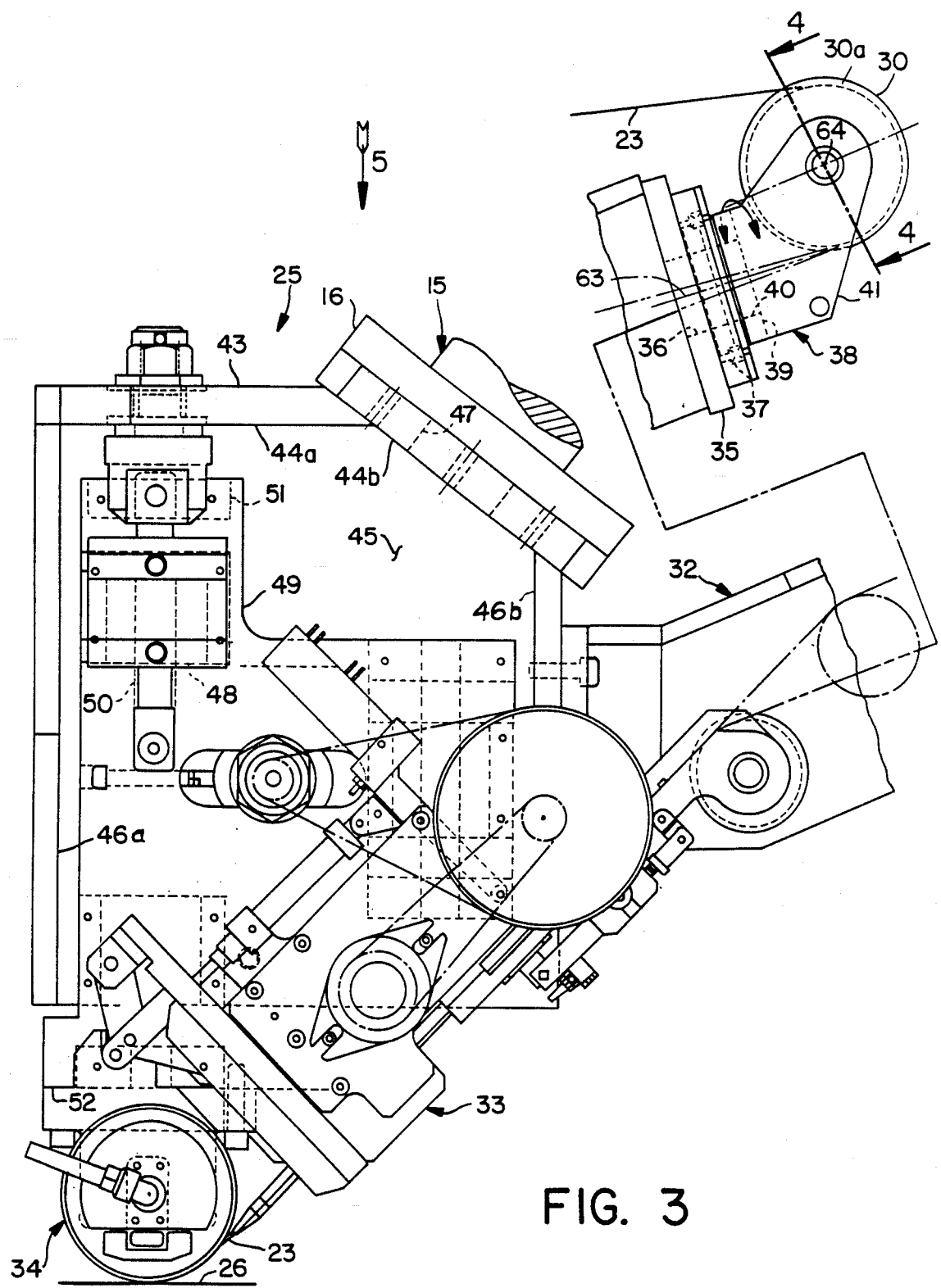
FIG. 3 is a close-up elevational view of the fiber placement head of FIG. 2.
Figure 5:
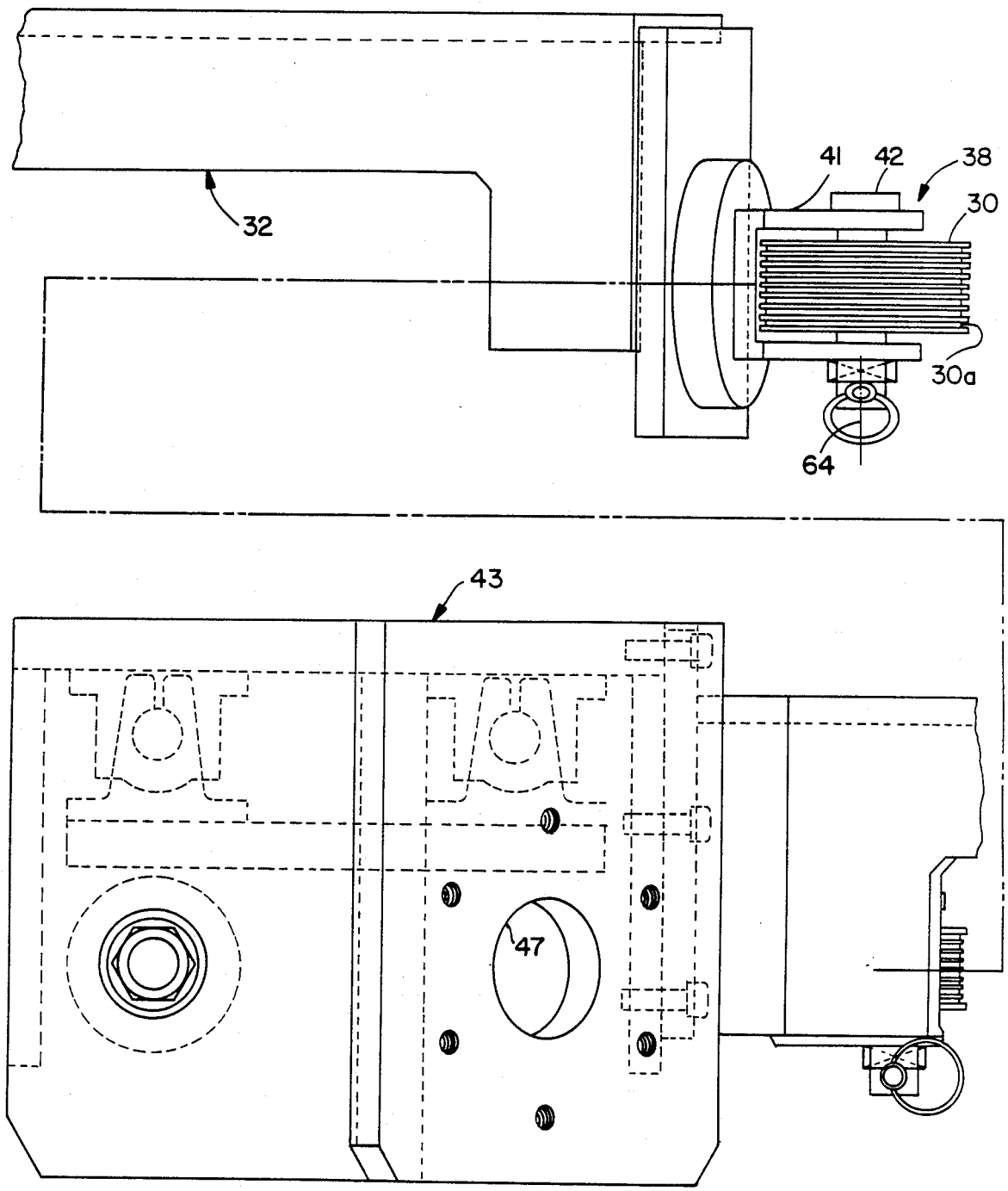
FIG. 5 is a plan view of the fiber placement head.

Referring now to FIG. 3, the fiber placement head 25 is shown in more detail, affixed to the tooling plate 16 of the wrist 15. The topmost end of the outboard support bracket 32 of the placement head 25 is fabricated of a plate 35 having a through clearance hole 36, and the plate 35 supports an antifriction bearing 37 which carries the redirect roller assembly 38. The assembly 38 is fabricated from a plate 39, having a through clearance hole 40, and welded parallel side plates 41. The parallel plates 41 captivate the redirect roller 30 which is freely journalled on a tubular support shaft 42 extending through the side plates 41. The fiber tows 23 are depicted parallel to one another, extending around grooves 30a in the roller 30, and passing down through the open outboard bracket 32 to the CCR unit 33.

Figure 4:
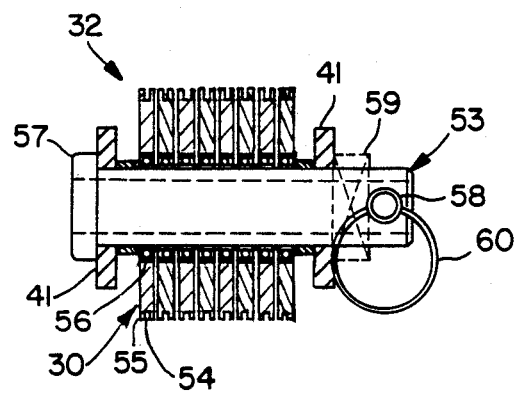
FIG. 4 is a section through a redirect roller.

The main bracket 43 of the placement head 25, see FIGS. 3 and 4, is comprised of a fabrication, having a horizontal top plate 44a, angled top corner plate 44b, and a vertical back plate 45, welded with side gussets 46a,b. A pilot bore 47 is provided through the top corner plate 44b for registration on the wrist tooling plate 16. Two pairs of vertically-oriented ball bushings 48 are affixed to the vertical plate 45 of the main bracket 43, for guiding a vertical slide 49. The slide 49 has a pair of precision bars 50 affixed to the rear by suitable support blocks 51, the bars 50 being free to ride vertically in the ball bushings 48. The slide 49 is configured as a notched plate, having uniform thickness, and the lowermost slide edge 52 carries the presser member assembly 34, which basically comprises a compliant roller, able to adapt to a variety of work-surface contours.

REDIRECT ROLLERS

Referring to FIG. 4, the grooved redirect guide roller 30 is journalled on a tubular pin 53. The roller 30 is assembled a plurality of spaced single-groove rings 54, i.e. each having a thin annular flange 55 at each side, and the rings 54 are carried by ball bearings 56 on the tubular pin 53 so there will be virtually no drag on the tows 23. The tubular pin 53 has a head 57 at one end and has a transverse pin 58 captivating a compression spring 59 at the other end. The transverse pin 58 may be fitted with a ring 60 for ease of disassembly. Spacers 61 at each side of the roller 30 keep the roller centered and free of dragging on the side plates 41.

The independent anti-friction support of the grooved rings 54 permits the fiber tows 23 to move at independent rates across the roller 30 without drag occurring.

Both roller assemblies 38 shown in FIG. 2 are identical, and each have pivot axes 62,63, to permit swivelling of the assembly 38 in accordance with the force components of the tensioned fiber tows 23.

With reference to FIG. 3, the axis 64 of the roller and pivot axis of the roller assembly 38 are, preferably nonintersecting, to permit a caster-like movement.

Figure 6:
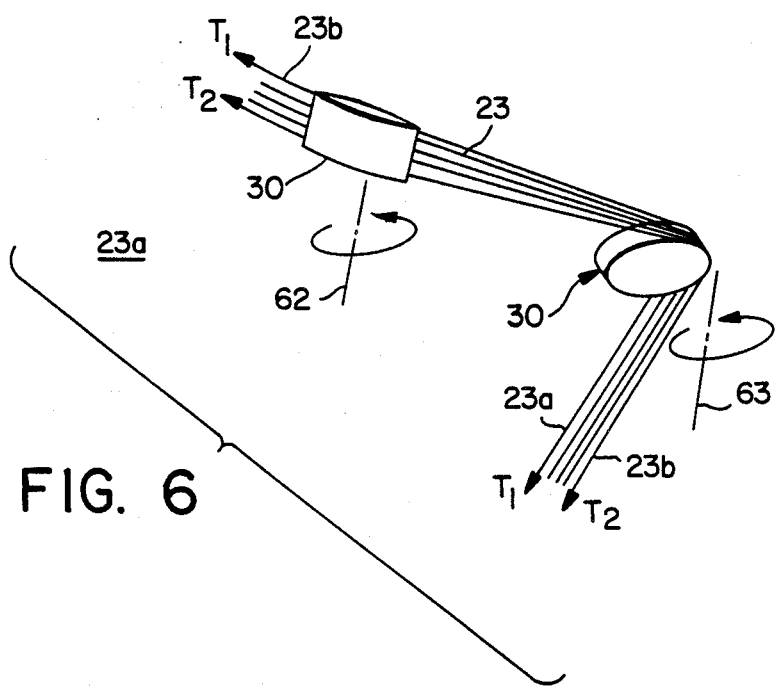
FIG. 6 is a diagrammatic view of the redirect roller pair.

FIG. 6 is a diagrammatic view of the redirect rollers 30, showing cooperation and caster-like movement as the fiber 23 are trained-around, and the outer fibers 23a,b (as well as intermediate fibers) are maintained under equal tension, $T_1 = T_2$.

What is claimed is:

1. In a fiber placement machine, having a band of fibers oriented with its length running along a path with respect to a relatively stationary machine member, the band of fibers being ultimately paid-out to a fiber application surface, an improved fiber guidance system comprising:

a fiber supply creel including plural spools of fiber mounted to said relatively stationary machine member said fiber supply creel also including means for maintaining tension on said fibers;

a manipulator wrist affixed to said relatively stationary machine member;

a fiber placement head affixed to said manipulator wrist, and having a fiber payout zone, said head capable of being manipulated through a variety of spatial orientations by said manipulator wrist, especially at least two-dimensional spatial orientations with respect to said relatively stationary machine member;

a plurality of fiber redirect rollers, having roller elements rotatable about a first roller axis with respect to a roller base, and wherein said roller base includes a bearing member for providing rotary movement of said base about a base axis transverse to the roller axis as said fiber placement head is manipulated, and wherein at least a first redirect roller is affixed to said relatively stationary machine member and at least a second redirect roller is affixed to said fiber placement head, and wherein a band of fibers is trained around said first and second redirect rollers under tension, and said redirect rollers will cooperatively swivel about their bases in accordance with spatial orientation of the placement head and in accordance with tension of the fiber band, thereby maintaining approximately equal tension at the outer fibers at each side of the fiber band, while guiding said fiber band.

* * * * *